United States Patent Office 2,870,017
Patented Jan. 20, 1959

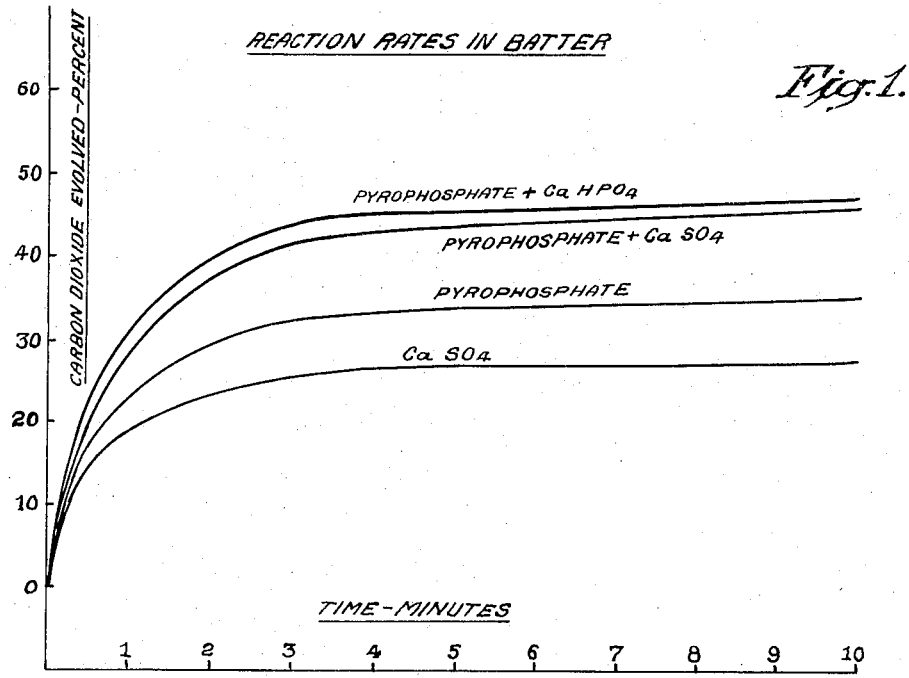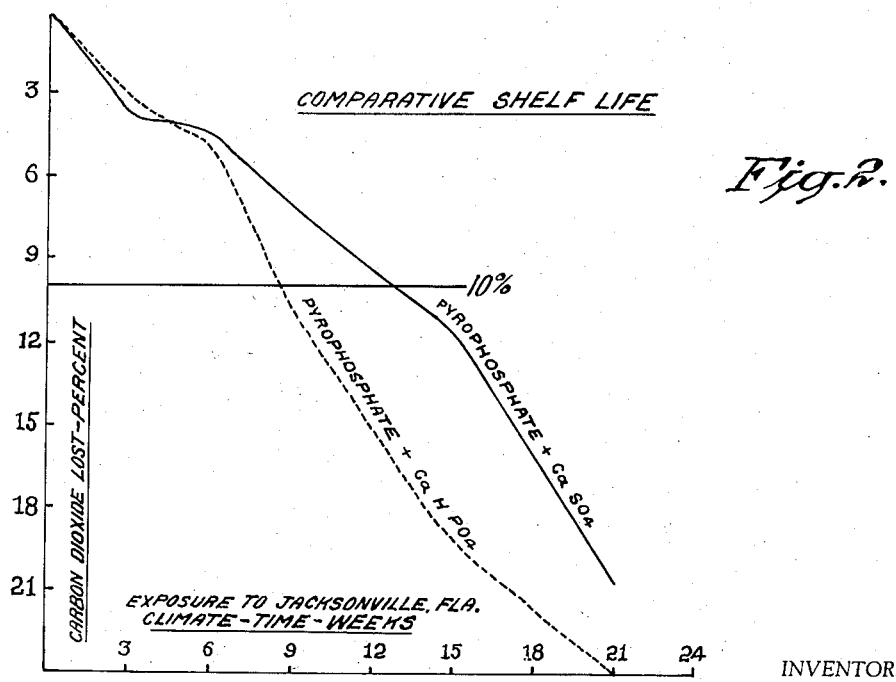

2,870,017

PYROPHOSPHATE BAKING POWDERS

William E. Barch, Stamford, Conn., assignor to Standard Brands Incorporated, New York, N. Y., a corporation of Delaware Application November 30, 1956, Serial No. 625,520

9 Claims. (Cl. 99—95)

This invention relates to pyrophosphate baking powders.

Baking powders contain as essential ingredients an acid-reacting material and sodium bicarbonate, with or without a filler. The acid-reacting materials customarily used are alum, tartaric acid or its acid salts, and acid salts of phosphoric acid, pyrophosphoric acid, or combinations of these materials.

Most modern baking powders are of the double action type, i. e., they contain a fast-acting acid to release sufficient carbon dioxide quickly enough to give a high viscosity, low density batter and a good lift during the early stages of baking before the starch coagulation temperature is reached, and a slow acting acid to liberate the balance and major part of the carbon dioxide slowly during the remainder of the baking period and to some extent as the finished cake cools. The quickly released gas acts before structure has set and is essential to best texture and maximum volume in the finished cake; the slowly released gas is essential to maintenance of maximum volume with minimum shrinkage after the cake structure has set, i. e., during the middle and last stages of baking and during cooling.

An object of the invention is to provide a double action baking powder having improved keeping qualities.

A further object of the invention is to provide a baking powder whose acid acting ingredients consist essentially of an alkali metal acid pyrophosphate and calcium sulfate whereby the keeping properties of the baking powder are enhanced.

Baking powders composed of sodium bicarbonate and calcium sulfate with or without a filler have been proposed but they have little leavening action.

Baking powders are known in which sodium acid pyrophosphate is the only acid but they are seldom used for two reasons. They lack "double action" properties, that is, little or no gas is released during the mixing stage, resulting in a low viscosity, "runny" batter and poor rise during the early heating stage in the oven. Texture of the resulting baked goods is adversely affected because temperatures are above the coagulation point of starch before more than a minor part of the leavening gas is released. Secondly, the residual salt, sodium tetra pyrophosphate, has a rather astringent bitter taste, readily noticeable in the baked goods.

It is customary, therefore, in pyrophosphate baking powders to have present, calcium ions to form tasteless neutral calcium pyrophosphate as residual salt, and a fast acting baking acid to give the proper release of gas in the batter before the oven. Both purposes are accomplished with monocalcium orthophosphate in U. S. Patent No. 1,834,747. However, mixtures of ortho and pyro phosphates are quite unstable with respect to absorption of atmospheric moisture and baking powders containing such mixtures have poorer shelf life than when either component is used singly.

When calcium sulfate was used with mixtures of the ortho and pyro phosphates, the instability of the ortho-pyro combination was greatly accentuated.

When calcium sulfate was used with an alkali metal pyrophosphate alone, three unexpected results were obtained in that, (1) keeping qualities were enhanced rather than reduced, (2) the baking powder had the typical double action character described above and (3) sufficient calcium ions were released to eliminate the residual pyro taste. Thus the net effect was the same as if calcium monophosphate had been used with the added advantages of lower cost and increased shelf life.

The following are examples of baking powders made in accordance with the invention.

|  | A | B | C |
|---|---|---|---|
| Sodium Acid Pyrophosphate | 41.7 | 41.7 | 41.7 |
| Sodium Bicarbonate | 30.0 | 30.0 | 30.0 |
| Calcium Sulfate | 5.0 | 14.1 | 28.3 |
| Starch | 23.3 | 14.2 |  |

An unusual feature of the invention is that while sodium acid pyrophosphate and sodium bicarbonate must be kept at or near stoichiometric proportions, this is not necessary for the calcium sulfate. Cake pH and the double action effect are little altered by changes in the concentration of calcium sulfate. The explanation probably lies in the very low water solubility of calcium sulfate. That part which does not dissolve remains inert. The small part which does dissolve is immediately strongly dissociated into weak calcium and strong sulfuric ions, the latter being the fast acting acid in the double action pair. It also follows that the rate of solution of the calcium sulfate and availability of the strong sulfuric ion will be greatest early in the batter mixing stage when the greatest amount of the quickly dissolving sodium bicarbonate is available. As it decreases, the amount of sulfuric ion reacting decreases, thus automatically limiting solution of fresh calcium sulfate. Such a set of conditions is ideal for the double action effect. A small amount of calcium sulfate is sufficient. Amounts between about 10% and about 20% are preferred.

The baking powder having the Formula B above was compared with prior art baking powders D, E and F having the following composition:

|  | D | E | F |
|---|---|---|---|
| Sodium Bicarbonate | 30 | 30 | 30 |
| Starch | 29 | 29.3 | 14.2 |
| Sodium Acid Pyrophosphate | 36 | 41.7 |  |
| Calcium Sulfate |  |  | 55.8 |
| Monocalcium Phosphate | 5 |  |  |

The reaction rates of these baking powders in yellow cake batter are expressed in the following table as total carbon dioxide evolved at minute intervals.

| Minutes | B | D | E | F |
|---|---|---|---|---|
| 1 | 29.5 | 30.9 | 22.8 | 19.0 |
| 2 | 36.7 | 39.8 | 29.0 | 23.2 |
| 3 | 41.7 | 44.1 | 32.4 | 26.2 |
| 4 | 42.9 | 45.1 | 33.4 | 26.6 |
| 5 | 43.6 | 45.5 | 33.8 | 26.9 |
| 6 | 44.2 | 45.8 | 34.1 | 26.9 |
| 7 | 44.6 | 46.0 | 34.4 | 27.1 |
| 8 | 45.2 | 46.5 | 34.7 | 27.3 |
| 9 | 45.7 | 46.7 | 35.0 | 27.5 |
| 10 | 46.0 | 46.8 | 35.2 | 27.5 |

These reaction rates are shown graphically in Fig. I of the drawing.

Baking results obtained with baking powders B, D and E are given in the following table.

| Baking Powder | Batter Density | Cake Volume | Cake pH | Cake Quality |
|---|---|---|---|---|
| B | 0.96 | 785 | 7.72 | normal. good. |
| D | 0.95 | 770 | 7.90 | normal. good. |
| E | 1.01 | 755 | 7.95 | dense grain, bitter taste. |

The figures in each case are the average of six bakings of yellow cake. Data for baking powder E are not included since its reaction rate was obviously too slow for leavening and cake made with it totally unsatisfactory.

It will be observed that baking powder E, containing sodium acid pyrophosphate as the sole acid ingredient, has no double action character. In baking it gives thin, low viscosity, high density batters reflected in low volume and indifferent quality in the finished cake. On the other hand, addition of calcium sulfate (baking powder B) brings about an acceleration of the reaction rate and gives results similar to those obtained with baking powder D.

To determine the gain in shelf life obtained according to the invention by the use of calcium sulfate as the fast acting acid instead of monocalcium phosphate, baking powders B and D were stored in the Jacksonville, Florida climate and the carbon dioxide loss was determined in each case after storage for 3, 6, 9, 15 and 21 weeks. The results obtained are given in the following table and are shown graphically in Fig. II of the drawing.

*Percent of total $CO_2$ lost after storage in Jacksonville, Florida, climate*

| Time, Weeks | Baking Powder B | Baking Powder D |
|---|---|---|
| 3 | 3.88 | 3.31 |
| 6 | 4.33 | 4.90 |
| 9 | 6.94 | 10.57 |
| 15 | 11.45 | 19.10 |
| 21 | 20.56 | 23.80 |

Whereas, baking powder D lost 10% of its carbon dioxide content in 8½ weeks, baking powder B did not lose this amount of carbon dioxide until after 13 weeks, thus showing a gain in shelf life of 53%.

Formula B used in the foregoing tests is typical of the baking powders of the present invention. Formulae A and C give comparable results.

Since certain modifications may be made in the compositions which embody the invention without departing from its scope, it is intended that all matter contained in the above description shall be interpreted as illustrative and not in a limiting sense. It is also to be understood that the following claims are intended to cover all of the generic and specific features of the invention herein described.

I claim:

1. A baking powder comprising a baking carbonate and material capable of reacting therewith to liberate carbon dioxide said material consisting essentially of an alkali metal acid pyrophosphate and calcium sulfate.

2. A baking powder comprising sodium bicarbonate, an alkali metal acid pyrophosphate and fast acting acidic material, the fast acting acidic material consisting essentially of calcium sulfate.

3. A double action pyrophosphate baking powder containing calcium sulfate as the sole fast-acting acid constituent.

4. A baking powder consisting essentially of sodium bicarbonate, sodium acid pyrophosphate and calcium sulfate.

5. A baking powder as claimed in claim 4 containing a filler.

6. A double action pyrophosphate baking powder containing a small but effective amount of calcium sulfate to give the baking powder a fast-acting character.

7. A baking powder comprising the following ingredients in approximately the indicated proportions:

| | Parts |
|---|---|
| Sodium bicarbonate | 30 |
| Sodium acid pyrophosphate | 42 |
| Calcium sulfate | 5–28 |
| Filler | 0–23 |

8. A baking powder comprising the following ingredients in approximately the indicated proportions:

| | Parts |
|---|---|
| Sodium bicarbonate | 30 |
| Sodium acid pyrophosphate | 42 |
| Calcium sulfate | 10–20 |
| Filler | 8–18 |

9. A baking powder comprising the following ingredients in approximately the indicated proportions:

| | Parts |
|---|---|
| Sodium bicarbonate | 30 |
| Sodium acid pyrophosphate | 42 |
| Calcium sulfate | 14 |
| Starch | 14 |

References Cited in the file of this patent

UNITED STATES PATENTS

| 2,000,160 | Broeg | May 7, 1935 |
| 2,131,433 | Fiske | Sept. 27, 1938 |
| 2,793,121 | Novitsky | May 21, 1957 |

OTHER REFERENCES

"Journal of The Association of Official Agricultural Chemists," vol. 2, No. 4, pp. 225 to 229 (1917).